United States Patent [19]
Gardner et al.

[11] Patent Number: 5,786,416
[45] Date of Patent: Jul. 28, 1998

[54] HIGH SPECIFIC GRAVITY MATERIAL

[75] Inventors: John Christopher Gardner, Bowdon; Peter James Gardner, Hale; Ian Peter Oliver, Rochdale; Terry Peake, Warrington, all of Great Britain

[73] Assignees: John C. Gardner; Peter J. Gardner, both of England

[21] Appl. No.: 959,956

[22] Filed: Oct. 24, 1997

Related U.S. Application Data

[63] Continuation of Ser. No. 593,016, Jan. 29, 1996, abandoned, which is a continuation of Ser. No. 301,981, Sep. 6, 1994, abandoned.

[30] Foreign Application Priority Data

Sep. 6, 1993 [GB] United Kingdom .............. 9318437

[51] Int. Cl.$^6$ .............. A01K 95/00; F42B 12/72; F42B 7/00; C08K 3/08
[52] U.S. Cl. .............. 524/440; 524/505; 43/43.1; 102/517
[58] Field of Search .............. 524/440, 505; 43/43.1; 102/517

[56] References Cited

U.S. PATENT DOCUMENTS

| | | | |
|---|---|---|---|
| 3,299,174 | 1/1967 | Kuhre | 525/98 |
| 3,491,056 | 1/1970 | Saunders et al. | 260/41 |
| 4,853,154 | 8/1989 | Icenogle | 523/200 |
| 4,904,725 | 2/1990 | Himes | 524/505 |
| 4,949,645 | 8/1990 | Hayward | 102/517 |

FOREIGN PATENT DOCUMENTS

| | | | |
|---|---|---|---|
| 546530 | 3/1993 | European Pat. Off. | |
| 116743 | 9/1980 | Japan | 524/505 |
| 234216 | 9/1989 | Japan | |
| 1740382 | 6/1992 | U.S.S.R. | 524/440 |
| 2150935 | 7/1985 | United Kingdom | |
| 2156357 | 10/1985 | United Kingdom | |
| 2179664 | 3/1987 | United Kingdom | |
| 93/16349 | 8/1993 | WIPO | |

OTHER PUBLICATIONS

John Zent, "Nontoxic Shot Update", *American Hunter* Feb. 1992; pp. 38, 39, 74.
Shell Chemical Company; "KRAT Thermoplastic Rubber"; at least as as early as 1991; 9 pages.
Evode Plastics; "Evoprene (Reg. TM)"; at least as early as 1991; 7 pages.
Evode Plastics; "Evoprene (Reg. TM) Super G"; at least as early as 1991; 4 pages.
Database WPI Section Ch, Week 8907 Derwent Publications Ltd. London, GB; Clas A32, AN 89–051352 XP002017817 & JP-A-64 001765 (Calp Kogyo KK), 6 Jan. 1989 abstract.
Database WPI Section Ch, Week 8916 Derwent Publications Ltd. London, GB; Clas A23, AN 89–119537 XP0017818 & JP-A-01 066 271 (Kanebo KK), 13 Mar. 1989 abstract.

*Primary Examiner*—David Buttner
*Attorney, Agent, or Firm*—Longacre & White

[57] ABSTRACT

A high specific gravity composition suitable for use as a lead-substitute, especially for firearms ammunition and angling weights, comprises:

(i) a polymer matrix comprising:
  (a) at least one rigid thermoplastic polymer component, e.g. polypropylene, polystyrene, etc. and
  (b) at least one elastomeric thermoplastic polymer component, e.g. various polystyrene-based copolymers; and (ii) dispersed in the polymer matrix particles of a high specific gravity weight material having a density and present in an amount such that the composition has a specific gravity of greater than one, preferably a specific gravity in the range 8 to 12.

The high specific gravity weight material is preferably tungsten powder.

8 Claims, No Drawings

HIGH SPECIFIC GRAVITY MATERIAL

This is a continuation of application Ser. No. 08/593,016, filed Jan. 29, 1996, which was abandoned upon the filing hereof, which itself was a continuation of application Ser. No. 08/301,981 filed Sep. 6, 1994, which is now abandoned.

FIELD OF THE INVENTION

This invention relates to materials having a high specific gravity, such as are used in practical applications where conventionally high specific gravity materials such as lead have been used. The invention relates particularly, though not exclusively, to high specific gravity material for use in the manufacture of high density products such as projectiles for firearms and weights for use in angling and other sports. The present invention also relates to such items formed from the material and to a process for the manufacture of such items.

BACKGROUND OF THE INVENTION AND PRIOR ART

In many practical applications where a material of high specific gravity is required, one of the most common materials used for this purpose is the metal lead, which as well as having one of the highest specific gravities of readily available common materials, also has a variety of other physical properties which makes it attractive for particular end uses, among the most hitherto common of these being as (or as a constituent of) projectiles for firearms (e.g. lead shot or copper sheathed lead bullets) and as angling weights for use in counteracting the windage and buoyancy of fishing lines. Lead also has good chemical stability and is relatively easy to manufacture into end product forms such as those mentioned above.

An ideal projectile material for example should have a high specific gravity in order to maintain velocity during flight and thereby maximise range. It should be sufficiently hard to fragmentalise "clay pigeon" targets on impact and to cleanly kill game, but it should also be soft enough to avoid damaging the interior surfaces of gun and rifle barrels and woodworking machinery that might subsequently encounter gunshot embedded in timber. Furthermore, it should not be so brittle as to disintegrate upon impact with hard targets, but instead should exhibit a degree of cohesive plastic yield, thereby minimising the risk of target contamination and of ricochet from solid objects in the field of fire. Advantageously, an ideal projectile material is also resilient enough to reduce recoil of the firearm from which it is discharged.

Nowadays, with increasing public awareness of environmental friendliness and prevention of pollution, as well as minimising health risks to animals and humans alike, ideal projectile materials should be non-toxic, biodegradable and recyclable. These latter properties are even more desirable of materials used for angling weights, since not only in this field is there greater human contact with the materials in question, but there are also greater pollution and health risks to animals and the environment. Toxic firearms ammunition, particularly on shooting ranges, also necessitates frequent and expensive cleaning out of target surfaces, with which come similar health hazards to humans involved in that operation.

For many years lead or lead alloys have generally been accepted as being "ideal" high specific gravity materials for applications such as those mentioned above, by reason of their particularly good balance of physical properties and ability to be easily converted into small, spherical shot. However, lead and its chemical derivatives have long been recognised as being toxic and the use of lead in many sporting applications is being progressively banned throughout the world.

Iron, steel, nickel, bismuth and a variety of other metals and their alloys have been suggested as, bases for alternative materials, often in combination with various binders, but although some of these alternative materials may have suitable specific gravities for satisfactory use as lead substitutes, they have serious disadvantages in respect of other physical properties, notably their vulnerability to chemical attack, in some cases insufficient non-toxicity, and in many cases too high hardness and brittleness for acceptable applicability to use as shot for firearms and for use in split form for attachment to fishing lines.

The primary object of the present invention therefore is to provide a high specific gravity material which has all the beneficial physical properties of lead or lead alloys in applications such as those mentioned above, yet does not suffer from the abovementioned problems associated with these known weight materials.

SUMMARY OF THE INVENTION

Accordingly, in a first aspect the present invention provides a composition comprising:

(i) a polymer matrix comprising
  (a) at least one rigid thermoplastic polymer component, and
  (b) at least one elastomeric thermoplastic polymer component; and (ii) dispersed in the polymer matrix particles of a high specific gravity weight material having a density and present in an amount such that the composition has a specific gravity of greater than one, preferably greater than four.

In a second aspect, the invention provides a method of making a composition having a specific gravity of greater than one, preferably greater than four, the method comprising:

(a) preparing a polymer matrix comprising
  (i) at least one rigid thermoplastic polymer component, and
  (ii) at least one elastomeric thermoplastic polymer component; and (b) dispersing in the polymer matrix particles of a high specific gravity weight material having a density and in an amount such that the composition has the said specific gravity of greater than one.

The composition thus prepared is preferably then subjected to a moulding process, by which discrete bodies of the composition are formed, such as are suitable for end uses such as ammunition for firearms, or angling weights.

Accordingly, in a preferred practical embodiment of the above method, the process further includes the steps of:

(c) forming a sheet or web of the thus prepared composition;

(d) passing the sheet or web between a pair of contra-rotating rollers, the surface of at least one of which has a plurality of recesses formed therein, whereby the sheet of composition conforms to the surface profile of said at least one roller; and (e) separating from the sheet the thus formed plurality of bodies of composition conformed to the shape of said recesses in said at least one roller.

In particularly preferred embodiments, the surfaces of both rollers have formed therein corresponding appropriately shaped recesses, such that the bodies of composition formed between the surfaces of the rollers are of the desired overall shape, for example spherical or near-spherical, such as can be used as or in ammunition for firearms or as angling weights, for example.

In an alternative preferred practial embodiment, the above process steps (a) and (b) are followed by the steps of:

(f) feeding an amount of the thus prepared composition to a moulding apparatus, particularly an injection moulding or compression moulding apparatus; and (g) forming discrete bodies of said composition by moulding.

The above alternative preferred method is particularly applicable to the formation of typically non-spherical bodies from the said composition, e.g. bullets for firearms, unusually shaped angling weights, etc.

In a third aspect, the invention provides the use of the high density composition of the first aspect of the invention as a lead-substitute material, such as in (or as a component of) ammunition for firearms and angling weights.

DETAILED DESCRIPTION OF THE INVENTION AND PREFERRED EMBODIMENTS

The present invention, and preferred embodiments of the various aspects thereof, will now be described in detail.

The essence of the present invention lies in the combination of the high specific gravity weight material, which is primarily responsible for giving the composition its required high density, with a special multi-component polymer matrix physically compatible therewith and which provides the composition with its desirable balance of physical properties, notably hardness and strength together with a degree of softness and plasticity. By use of this combination of components in the composition of the invention, it is possible to select those materials which are individually non-toxic, biodegradable and recyclable to a desired extent, but which in combination give a high density composition which exhibits most, if not all, the desirable physical characteristics of lead or lead alloys.

The polymer matrix of the composition of this invention comprises at least one rigid thermoplastic polymer component and at least one elastomeric thermoplastic polymer component.

As used herein, the term "rigid thermoplastic polymer" means a thermoplastic polymer which at ambient temperatures is below its first order, and preferably below its second order, transition temperature. In other words, this material is one which at ambient temperatures is a solid having an amorphous, or more preferably a crystalline, structure. It is this component of the polymer matrix which is primarily responsible for the hardness and strength characteristics of the final composition.

Suitable polymers for use in the invention as the rigid thermoplastic polymer component include polypropylene, polystyrene, polyethylene, polyvinylchloride, acrylonitrile-butadiene-styrene copolymer, and blends thereof. Polypropylene and polystyrene are particularly preferred. There are many examples of these "rigid" polymers suitable for use in the invention which are available commercially. Homopolymers are preferred, although copolymers (both random and block copolymers, especially with polyethylene) of any of the aforementioned polymeric species are possible and may be used to give improved impact resistance and to reduce the onset of brittleness at low ambient temperatures. Selection of an optimum polymer may depend upon the exact physical properties required of it, which may depend to at least some extent on the amount of it to be incorporated in the polymer matrix and the relative physical properties of the elastomeric polymer component, and possibly any other components of the composition which are present, including the high specific gravity weight material dispersed therein.

Preferably the rigid thermoplastic polymer component should be fusible, in order that they may be readily blended with the other polymer component or components of the composition and with the high specific gravity weight material to be dispersed therewithin. Preferably the rigid thermoplastic polymer component of the matrix has a first order (and preferably also a second order) glass transition temperature of less than about 250° C. This temperature represents the preferred maximum melting point of the rigid thermoplastic polymer component of the matrix.

As used herein, the term "elastomeric thermoplastic polymer" means a thermoplastic polymer which at ambient temperatures exhibits a suitable degree of resilience and/or softness such that those properties of the final polymer matrix are increased compared with those physical properties of the rigid thermoplastic polymer component alone.

Preferred elastomeric thermoplastic polymers for use in the polymer matrix are block copolymers comprising at least one amorphous elastomeric unit species. Examples of block copolymers of this type include polystyrene-polyethylene/polybutylene block copolymer, polystyrene-butadiene block copolymer and polystyrene-polyisoprene block copolymer.

Polymers of this type are commercially available, for example as the KRATON (trade mark) series of polymers from Shell Chemical Company (for example the KRATON D and KRATON G ranges of polymers) and the EVOPRENE (trade mark) series of polymers (e.g. EVOPRENE G and SUPER G) from Evode Plastics Limited.

It is the elastomeric nature of this second thermoplastic polymer component of the matrix of the composition which is primarily responsible for the softness and/or resilience physical properties of the final composition.

Depending upon the composition of the above block copolymer species, the elastomeric thermoplastic polymer component of the matrix may be chemically saturated or unsaturated. For example, polystyrene-polyethylene/polybutylene block copolymer is a saturated species and is therefore much more resistant to atmospheric oxidation. On the other hand, the corresponding block copolymer comprising polybutadiene or polyisoprene units is ethylenically unsaturated, and is therefore more susceptible to atmospheric oxidation. These properties can be important in designing the polymer matrix for particular desired uses of the composition. For instance, in the context of shot for firearms, where the material is designed for use on shooting ranges, where recyclability is preferred, the saturated block copolymer species may be preferred, so that the composition undergoes less oxidative degradation over time. In contrast, where the material is designed for use as shot for shooting game, the unsaturated species may be preferred, so that shot which is not reclaimable from the animal itself degrades with time, so that ultimately pollution and environmental contamination is reduced. Likewise, where the material is designed for use as angling weights, the unsaturated and therefore more readily degradable material may be preferred.

Generally speaking the rigid and/or the elastomeric thermoplastic polymer component species of the matrix are selected such that their molecular weight(E) is/are high enough to give the requisite strength of the final product, but not too high such that melt viscosity is increased to an extent at which satisfactory extrusion, moulding and forming operations are hindered.

In accordance with the invention the polymer matrix comprising the above defined rigid and elastomeric thermoplastic polymer components has dispersed therein, preferably evenly dispersed therein, particles of a high specific gravity material, which is the component of the composition which is primarily responsible for raising its density to the required value comparable to that of lead, or whatever density is required of the particular application for which the material is designed.

In order not to compromise the advantageous non-toxicity and environmental friendliness of the composition of the invention, it is generally important that the high density weight material dispersed in the polymer matrix is itself non-toxic and is present in not too high a proportion, which therefore means that the material must itself have a relatively very high density. The relatively low percentage content of the weight material is also important for not compromising the advantageous physical properties of the polymer matrix, which give the composition of the invention Its desirable balanced range of physical properties.

The high specific gravity weight material is present in the composition of the invention in particulate form and may be added to the polymer matrix during manufacture in the form of a powder or grains thereof. Small particles are preferred, for example having sizes in the range from about 1 to about 100 microns, preferably up to about 20 microns, more preferably up to 10 about microns, especially up to about 5 microns.

Within the above preferred criteria, therefore, any particulate high specific gravity material may be used as this component of the composition of the invention. One particularly preferred example of such a material which has been found to be useful In the invention is tungsten powder, which is non-toxic and itself has a very high specific gravity.

Other possible examples of high specific gravity material for use as this component in the invention include for example other high density metals, ceramic materials and naturally occurring high density substances such as certain mineral substances.

The relative proportions of the major components of the compositions of this invention may vary within certain preferred ranges, depending upon the physical properties of the individual material employed and the overall balance of properties required of the composition.

Generally speaking the particulate high density weight material will be present in an amount only sufficient for raising the density of the composition to the required value, and no more than this. A density of the final composition of at least about 4 or 5 g/cm$^3$, is preferred. More preferably the density of the final composition is in the range of from about 8 to about 12 g/cm$^3$. Typically, a density in the region of about 9 to about 10 g/cm$^3$ is desirable for use of the composition as gun shot, this value being readily obtainable with the preferred particulate high density materials mentioned above and having been found to give a final composition having at least as good a balance of desirable physical and ballistic properties as conventional high density materials. The amount of powdered tungsten (or other high density weight material) to be added to the basic polymer matrix to achieve this value is a simple matter of calculation or trial and error. Typically, however, the high density weight material may be present in the final composition in an amount of from about 5 to about 70% by volume of the total composition, preferably from about 10 to about 65% by volume, more preferably from about 20 to about 60% by volume, the balance being the. polymer matrix.

The composition of the polymer matrix, however, is more critical in terms of the balance of physical properties of the individual components, as in order to achieve optimum softness, resilience, hardness, strength, plastic yield and film strength etc., it is generally important that the content of the softer, elastomeric thermoplastic polymer component is not too high or too low compared with the content of the harder, rigid thermoplastic polymer component.

The polymer matrix of the composition of the invention preferably comprises the rigid thermoplastic polymer component in an amount within the range from about 5 to about 80% by volume of the polymer matrix, more preferably from about 10 to about 60% by volume, and the elastomeric thermoplastic polymer component in an amount within the range from about 10 to about 90% by volume, more preferably from about 30 to about 80% by volume. Even more preferably, the rigid thermoplastic polymer component is present in the matrix in an amount within the range from about 20 to about 50% by volume of the matrix, and the elastomeric thermoplastic polymer component is present in an amount within the range from about 40 to about 70% by volume of the matrix.

Preferably the high density composition of the invention has a hardness value, as measured according to the Shore D scale, in the range of from about 55 to about 85. A hardness of less than about 55 Shore D gives a product which is generally too soft for applications such as shot or bullets for firearms, where the projectile would tend to distort too much upon impact and thereby absorb much of its own shock-causing energy. A hardness of above about 85 Shore D gives a product which is generally too hard, causing projectiles made therefrom to penetrate and damage targets such as game, rather than to slightly flatten and cause a shock wave upon impact. Too hard a material may also have too high brittleness and may furthermore be likely to cause damage to the interior of gun and rifle barrels.

The composition of the invention may be manufactured by conventional methods well known in polymer technology, as are well known to the person skilled in the art and well described in the literature. For example, the rigid thermoplastic polymer and elastomeric thermoplastic polymer components are heated to above their melting temperature and one of these components added to the other with mixing in a standard type of mixer until a completely homogeneous matrix is formed, optionally with further heating if necessary. Once the matrix is fully mixed and while the mixture Is still in its molten or at least soft state, the particulate high specific gravity weight material is added, with further stirring or mixing in order to evenly disperse the particles in the matrix. Stirring or other form of mixing may be continued until complete dispersion is achieved, following which the composition may be cooled and passed to the next processing stage, which is preferably the formation of discrete bodies of the composition by moulding.

In practical embodiments of the invention, the composition may further include a release agent and/or processing aid, in order to aid removal of end-produced item(s) formed from the composition by moulding from the moulding apparatus. Suitable release agents/processing aids are well known in the art and include for example silicone-based and/or oil-based products such as SUPER S aerosol release agent ex Marbo and STRUCTOL WS180 (trade mark) ex Schill and Seilacher GmbH & Co. (The latter product is a long chain fatty acid/silicone internal release agent and processing aid).

The release agent/processing aid may preferably be included in the composition as an integral internal component or alternatively may be applied externally, e.g. by pressing or rolling or by coating or spraying, to the surface (s) of the moulding apparatus and/or the composition to be moulded, prior to the moulding operation commencing.

In one preferred form of the moulding operation by which discrete bodies of the composition are formed, preferably while the composition is still soft and not fully hardened, a strip or web of the composition is formed by means of for example a hot calendering or extrusion process. The strip or web of composition is then subjected to a pressing operation in which small, spherical or near-spherical bodies of the high density composition are produced, so that the product resembles and is suitable for use as a replacement for conventional lead shot such as is used in cartridges for fire-arms or (generally in split form) as angling weights.

In a preferred form of this pressing operation the strip or web of composition is passed between two contra-rotating rollers, each (or possibly just one) of which has formed in its surface a plurality of recesses, e.g. hemispherical recesses, whereby when passed between the rollers in a soft state, the strip of composition is pressed to assume the surface profile of the roller surface(s). Most preferably, the recesses are in the surfaces of both rollers and are in register with each other, so that a spherical or near-spherical body is produced between them when the strip is pressed therebetween. Desirably, the surface of both rollers between the recesses formed therein are spaced apart a small distance from each other, e.g. by a distance of between about 0.05 and 0.5 mm, preferably in the region of about 0.08 to 0.2 mm, so that after the pressing operation the strip remains as a united web, with the individually formed bodies of composition joined together by thin, remnant portions of the web which can be subsequently removed.

In the above process, the rollers are contra-rotating rollers, one or (preferably) both of which are driven by a motor, as is conventional in the art. The strip or web which is fed into the nip between the rollers is preferably heated to between 100° and 250° C., so that the composition is sufficiently soft, but not too soft, so that it is readily formed to the required shape, yet retains that shape upon exiting from the rollers and subsequently cooling. The separation of the rollers and the thickness of the sheet or web are preferably maintained so as to yield a film, within which are disposed the mouldings, of such thickness that its strength is sufficient for it to be drawn from the rollers substantially intact. The temperature of the rollers may be maintained at a level low enough to "freeze-in" the shape of the newly profiled sheet or web, but not too low to cause brittleness and premature fracture. Typically, the roller temperature is between ambient and 200° C., and need not necessarily be the same for both of the rollers. The strip or web may follow a sector of one of the rollers in order that it may have more time to thermally equilibrate.

Once formed as described above, the sheet of formed mouldings of the composition of the invention may be separated from the interconnecting thin skin by a subsequent mechanical agitation process such as tumbling or grinding, which is preferably done at a temperature low enough to render the thin sheet friable, for example at ambient temperatures. Further tumbling or grinding may be performed in order to remove burrs and to effect smoothing/polishing. If desired, this subsequent tumbling operation may be conducted at elevated temperatures, preferably between 100° C. and 200° C., so that any particles of flash still connected to the mouldings may be substantially rolled back into the spherical or near spherical bodies, the surfaces of the mouldings thereby becoming smoothed and/or polished.

In the interests of economy, any detached particles of burr or flash material may be remixed into subsequent batches of composition during manufacture.

As a final processing step, the individual pellets can be screened, sorted and packed in readiness for subsequent use. In the case of weights for angling, the pellets may be subjected to a partial splitting operation as is conventional in the context of lead fishing weights.

In an alternative moulding process, the composition of the invention may be formed into discrete bodies directly by means of conventional moulding apparatus and moulding techniques, particularly injection or compression moulding, examples of which are well known in the art and widely used commercially. Such can be used to form discrete bodies of the high density composition of the invention of any desired size and shape and similar post-moulding and/or finishing steps as described above are applicable here also.

The invention is further illustrated by the following Examples, which are not to be construed as limiting the scope of the present invention in any way.

EXAMPLE 1

A high specific gravity composition according to the invention was prepared according to the preferred method described herein, with the following composition:

| INGREDIENT | PARTS BY WEIGHT |
| --- | --- |
| Tungsten powder (≦5 micron) | 1800 |
| Polypropylene HE 7100[1] | 342 |
| Kraton G 1652 | 514 |
| Structol WS 180 | 8.4 |

[1]ex Shell

The above composition corresponds to a polypropylene: Kraton volume ratio of 40:60.

The composition had a specific gravity of 9.5 and a Shore D hardness value of 65, corresponding to a flexural modulus of about 400 MPa.

EXAMPLE 2

Another high specific gravity composition according to the invention was prepared according to the preferred method described herein, with the following composition:

| INGREDIENT | PARTS BY WEIGHT |
| --- | --- |
| Tungsten powder (≦5 micron) | 1800 |
| Polypropylene HE7100 | 428 |
| Kraton G 1652 | 428 |
| Structol ws 180 | 8.4 |

The above composition corresponds to a polypropylene: Kraton volume ratio of 50:50.

The composition had a specific gravity of 9.52 and a Shore D hardness value of 75, corresponding to a flexural modulus of about 550 MPa.

EXAMPLE 3

Gunshot was made using the composition of Example 1 above, according to the preferred method described herein. The shot produced was of No. 7½ size. The shot was assembled into 12-bore cartridges at the standard 1 ounce loading. Cartridges were then used to test the ballistics of the new shot material upon firing from a standard 12-bore shotgun.

Initial ballistics tests for 28 gms of the No. 7½ shot gave a muzzle velocity of 407 m/sec, a barrel time of 3180 microseconds and a barrel pressure of 509 bar. Target spread patterns and wood penetration at 25 and 30 meters were identical to those obtained with cartridges of standard lead shot. Rabbit, pigeon and pheasant were shot cleanly yet without any gratuitous carcass damage.

At a trial conducted at the Chatcombe Shooting Ground, Cheltenham, local, national and world champion clay pigeon marksmen were unable to detect any difference in ballistics performance between lead and the new shot material. If anything, the tungsten based shot gave a smoother recoil.

Further tests done with factory loads showed pattern densities of 74% (40 yards/30" diam. circle), at velocities up to 405 m/sec, this being identical to the behaviour of lead shot. High velocity cartridges were made up and again behaviour was identical to the lead equivalents. For velocities of around 420 m/sec it is to be expected that a No. 7 shot size tightens spread patterns.

EXAMPLE 4

(Evaluation of Bullets)

Tooling to produce 0.357 inch and 5.56 mm bullets was made and from the composition of Example 2 above quantities of each type of bullet were compression moulded at 200° C. and cooled to 60° C. prior to removal from the mould. As well as some in the 75 Shore material, some bullets were also made in 65 Shore material (from Example 1). A first pistol firing was done with 75 Shore, 7.78 gm, 0.357 inch bullets with a small 7 gram charge. This cautious approach was made in case the bullet swelled and jammed in the breech when initially impacted by the igniting charge. In fact both the 75 Shore and 65 Shore bullets were safely discharged at up to 500 m/sec muzzle velocity with a 14 gram charge. The bullets did not keyhole, but hit the bull consistently, remaining cohesive on impact with Kevlar based bullet-proof material.

5.56 mm NATO rounds weighing 3.59 grams were made up in 75 Shore material (Example 2) with various amounts of propellant, to give muzzle velocities ranging from 776 to 1002 m/sec. Above 900 m/sec the material gave indications of instability, one round breaking up before hitting the target alloy sheet and another keyholing. However, at velocities up to 900 m/sec, the bullets flew straight and true.

A remarkable feature of the new bullet material is that at 882 and 1001 m/sec the bullets imparted all their kinetic energy to flesh simulating clay targets, causing them to physically explode, the process being more efficient in the case of the 882 m/sec experiment. The clay was originally formed into 125 mm diameter×125 mm cylinders and the bullets were aimed at them axially. A 22 swg aluminium sheet 100 mm down range was dented but not holed. The 1001 m/sec firing disintegrated the clay but gave its residue sufficient forward momentum to make an approximately 100 mm diameter burst in the aluminium. Both bullets completely disintegrated and the widely dispersed fragments of the clay target were observed to be universally contaminated with grey tungsten powder.

Whilst not intending to be limited by theory, the mechanism of this behaviour is believed to be as follows. The energy released on impact and during penetration was sufficient to melt the polymer matrix binder and release the 95% by mass of tungsten powder in a starburst which destroyed the target, particles of which were scattered evenly around the walls, floor and ceiling of the target room. By comparison, a standard NATO round merely pierced a rough 30–40 mm diameter hole through the clay target and continued on its way through the aluminium sheet. The use of this new bullet material at around 850 m/sec could thus be of interest in security operations within fragile environments (e.g. aircraft), provided, of course, that the bullet first it its intended target.

High velocity 5.56 mm 75 Shore rounds, when compared with standard 5.56 mm NATO copper sheathed lead bullets, were observed to give a remarkably high penetration of GRP blocks used to evaluate likely performance against bullet-proof clothing.

It was interesting to observe that in the case of 0.357 inch rounds, a circle of aluminium was punched out of the 22 swg target and then compressed to a thin disc as the bullet travelled with it until mutual compaction against the Kevlar fabric. The residual cylindrical shanks of the bullets had even parallel axial marks corresponding to the barrel rifling, giving a good indication that spin had been imparted to the bullet. The fact that the novel bullet material is resilient offers the possibility that made up rounds may not require grease bands. Their cohesive deformability and low modulus compared to that of solid metals is anticipated to reduce the energy of any ricochet. Overall, bullets made from this material would seem ideal for use in target practice.

EXAMPLE 5

The following describes in detail exemplary manufacturing methods for producing shot and bullets of the novel high specific gravity material of the invention.

Compounding

Mixing trials were carried out on an APV-Baker MP2030 twin screw extruder fitted with a vacuum vent and a "Ktron" twin screw feed hopper. The barrel was electrically heated and water spray cooled as standard. Barrel temperatures ranged from 185° C. at the hopper to 210° C. at the 5 mm diameter twin "bootlace" die. The extrudate was cooled and fed into an Accrapak pelletiser. Extrusion rates of 15 liters/hour were achieved with a specific energy input of 0.25 kW.hrs/liter at 80% of maximum rotor torque. For production it would be better to have an air cooled stainless steel take-off conveyor to avoid risk of water absorption.

Comparative trials were done with a 50 mm single screw Bone-Craven extruder fitted with a RAPRA six-row Transfer Cavity mixing head. Again, barrel temperatures were set to 185° C. and 210° C. at the die. At 60 rpm output was 7.5 liters/hr. At 100 rpm output rose to 23 liters/hr with a specific energy input of 0.3 kW/hrs/liter. It proved impossible to control the temperature of the extrudate which rose to over 265° C. and degraded. This was no doubt due to the less efficient fan cooling of the barrel and the high frictional energy input from the Transfer Cavity head. In view of these shortcomings it was thought better to take advantage of the more expensive but much higher technology adiabatic twin screw..mixing principle. The powdered components are accurately weighed out and tumble mixed. The blend is then placed in the hopper, extruded, pelletised and stored in paper sacks for subsequent use.

Injection Moulding

For the manufacture of bullets the pellets are fed directly into the hopper of a horizontal injection moulding machine fitted with tooling incorporating hot runners. During successful injection moulding trials, barrel temperatures were set at 220° C. at the hopper, 210° C. at the centre, 210° C. at the nozzle with the mould kept at 80° C. There were no problems with ejection of either product or sprue. In this particular case, the products were rings 53 mm o.d.×47 mm i.d.×7 mm wide weighing 26.7 gms. Mould shrinkage was 1%. In view of the fast cycling possible with this highly thermally conductive material, high torque screws and high capacity/high pressure hydraulics are a necessary feature of the machine. In multicavity production tooling, 3.6 gm 5.56 mm bullets are anticipated to cycle in under 10 seconds and 7.7 gm 0.357 inch bullets in under 15 seconds.

Recycling

Recycling may be a critical consideration for the economics of using this material in enclosed shooting ranges. The tungsten based material is first separated from metallic contaminants such as spent lead bullets by, for example utilising the different electrical properties of each material. The mixture is first sieved to remove fines and foreign bodies and then streamed from a hopper down an inclined plane through an induced magnetic field which alters in intensity when a metallic impurity is intercepted. A servo mechanism then diverts the impurity from the main stream.

The new material is very stable and after separation and blending with virgin material, it can be recycled many times, perhaps with the source firing range being reimbursed for some of the raw material value of the returns.

Shot Manufacture

No. 7½ gauge spherical shot was manufactured in a 2,500 cavity mould be compressing a thin sheet of compound at 200° C. and then cooling it under pressure to 60° C. before removal. The manufacturing principle involves the extrusion of a hot thin rectangular section strip of thermoplastic compound into the nip of cooler adjacent rollers contra-rotating strictly in phase. These rollers will have corresponding hemispherical cavities machines into their peripheral surfaces. Speeds and temperatures are accurately controlled to enable a stable continuous strip of formed interconnected ball mouldings to be produced. After cooling to ambient, the sheet is tumbled and ground to separate the individual spheres.

Early shooting trials have shown that the equatorial flash needs to be completely removed to ensure tight target patterns. Accordingly, newly separated shot is tumbled in a metal drum induction heated to about 180° C. At this temperature the flash softens and is rolled back into the main body. The rolling action also maximises the sphericity and smooth finish of each ball.

It is to be understood that the present invention, and preferred embodiments of the various aspects thereof, have been described above by way of example only and should not be construed as limiting the scope of the present invention as claimed. Many variations and modifications from what has been specifically described are possible within the scope of the claimed invention, as will be readily appreciated by persons skilled in the art.

We claim:

1. Ammunition for a firearm, or an angling weight, comprising:
   (i) a polymer matrix comprising,
      (a) at least one rigid thermoplastic polymer component selected from the group consisting of polypropylene, polystyrene, polyvinyl chloride, acrylonitrile-butadiene-styrene copolymer and mixtures and copolymers thereof, and
      (b) at least one elastomeric thermoplastic polymer component selected from block copolymers having at least one amorphous elastomeric unit component; and
   (ii) dispersed in the polymer matrix particles of a high specific gravity weight material having a density and present in an amount such that the composition has a specific gravity of greater than four.

2. Ammunition for a firearm, or an angling weight, according to claim 1, which has a specific gravity in the range 8 to 12.

3. Ammunition for a firearm, or an angling weight, according to claim 1, wherein the at least one rigid thermoplastic polymer component has a melting temperature of less than 250° C.

4. Ammunition for a firearm, or an angling weight, according to claim 1, wherein the block copolymer is a block copolymer of polystyrene with any of the following: ethylene/butylene copolymer, butadiene, isoprene, or mixtures thereof.

5. Ammunition for a firearm, or an angling weight, according to claim 1, wherein the particulate high specific gravity material dispersed in the polymer matrix is tungsten powder.

6. Ammunition for a firearm, or an angling weight, according to claim 1, wherein the polymer matrix comprises the rigid thermoplastic polymer component in an amount of from 5 to 80% by volume of the matrix and the elastomeric thermoplastic component in an amount of from 10 to 90% by volume of the matrix.

7. Ammunition for a firearm, or an angling weight, according to claim 1, wherein the high specific gravity weight material is present in the composition in an amount of from 5 to 70% by volume thereof.

8. Ammunition for a firearm, or an angling weight, according to claim 1, which has a hardness value in the range 55 to 85 Shore D.

* * * * *

UNITED STATES PATENT AND TRADEMARK OFFICE
CERTIFICATE OF CORRECTION

PATENT NO. : 5,786,416
DATED : July 28, 1998
INVENTOR(S) : GARDNER, J. et al.

It is certified that error appears in the above-identified patent and that said Letters Patent is hereby corrected as shown below:

Column 1, line 34, replace "Into" with "into"
Column 2, line 7, delete"." from between "as" and "basis"
Column 5, line 1, replace "weight(E) is/are" with "weights are"
Column 5, line 25, replace "Its" by "its"
Column 5, line 38, replace "In" with"in"
Column 6, line 53, replace "Is" with "is"
Column 10, line 64, omit ".." between "screw" and "mixng"
Colum 9, lines 40 and 45 in both places the word "gram" has been erroneously used instead of the correct term "grain".

UNITED STATES PATENT AND TRADEMARK OFFICE
CERTIFICATE OF CORRECTION

PATENT NO.   : 5,786,416
DATED        : July 28, 1998
INVENTOR(S)  : Gardner, J. et al It is certified that error appears in the above-identified patent and that said Letters Patent is hereby corrected as shown below:

On the title page: Item [75] Inventors: Address:

Peter James Gardner correct address should read

-- 4 Carlton Court Hale, Cheshire, WA 15 8RJ, United Kingdom --.

Signed and Sealed this

Seventeenth Day of October, 2000

Attest:

Q. TODD DICKINSON

*Attesting Officer*     *Director of Patents and Trademarks*